Nov. 13, 1923.

Re. 15,723

H. LANDSIEDEL

ADDING MACHINE

Original Filed July 12, 1920 3 Sheets-Sheet 1

INVENTOR.
HARRY LANDSIEDEL,
BY Rippey & Kingsland,
HIS ATTORNEYS.

Nov. 13, 1923. Re. 15,723

H. LANDSIEDEL

ADDING MACHINE

Original Filed July 12, 1920 3 Sheets-Sheet 2

INVENTOR.
HARRY LANDSIEDEL,
BY Rippey Kingsland,
HIS ATTORNEYS.

Nov. 13, 1923. Re. 15,723
H. LANDSIEDEL
ADDING MACHINE
Original Filed July 12, 1920 3 Sheets-Sheet 3
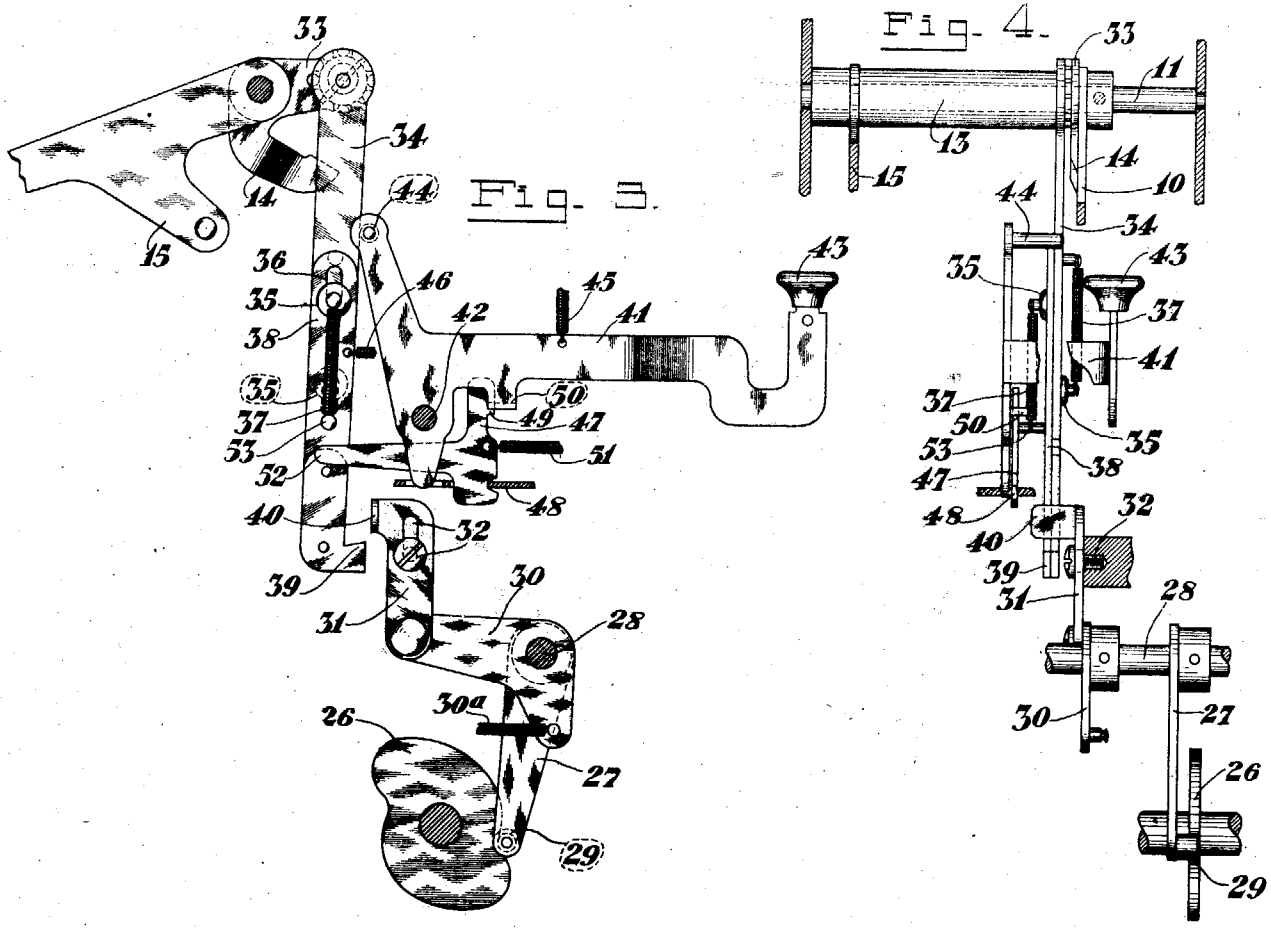
INVENTOR.
HARRY LANDSIEDEL,
BY Rippey & Kingsland,
HIS ATTORNEYS.

Reissued Nov. 13, 1923.

Re. 15,723

UNITED STATES PATENT OFFICE.

HARRY LANDSIEDEL, OF NORWOOD, OHIO, ASSIGNOR TO THE DALTON ADDING MACHINE COMPANY, OF CINCINNATI, OHIO, A CORPORATION OF OHIO.

ADDING MACHINE.

Original No. 1,444,126, dated February 6, 1923, Serial No. 395,769. Filed July 12, 1920. Application for reissue filed May 4, 1923. Serial No. 636,756.

*To all whom it may concern:*

Be it known that I, HARRY LANDSIEDEL, a citizen of the United States, residing at Norwood, Hamilton County, Ohio, have invented a new and useful Adding Machine, of which the following is a specification.

This invention relates to adding machines.

The present invention has special reference to adding machines having differential mechanism in which numbers are set up by operation of numeral keys provided for that purpose. Sometimes in the operation of adding machines the user, through inadvertence, accident or mistake, strikes the wrong key with the result that the wrong number is set up in the differential mechanism. For the correction of such errors adding machines have been provided with mechanism for clearing the differential mechanism without the necessity of operating the adding mechanism, thus correcting the error and permitting the user to set up the right number in the differential mechanism without entering into the adding mechanism the wrong number which had been set up.

Adding machines have also been provided with motors which may be controlled by the user of the machine to perform the work of operating the machine and the various mechanisms thereof to cause the machine to perform the desired calculations as the numbers are set up in the differential mechanism.

The present invention has special reference to mechanism operable by the motor to clear the differential mechanism in case error is made by the user in setting up a number in the differential mechanism.

An object of the present invention is to provide an adding machine with equipment to utilize the power of the motor to clear the differential mechanism of error without disturbing the adding mechanism of the machine.

Another object of the invention is to provide means under control of the user whereby the power of the motor may be utilized when desired to restore the differential mechanism to a clear condition without operating the usual manually operable correction key which, however, may be used when desired independently of the motor.

Another object is to provide means for clearing the differential mechanism, which means is capable of short and facile operation and which in fact operates with the light and responsive operation characterizing the operation of the numeral keys of the machine.

Other objects will appear from the following description in which reference is made to the drawing illustrating a preferred embodiment of the invention in connection with the Dalton adding machine, and in which—

Fig. 3 is a detailed side elevation of parts under control of the motor for clearing the differential mechanism.

Fig. 4 is a front view of the same parts shown in Fig. 3.

Figure 1:
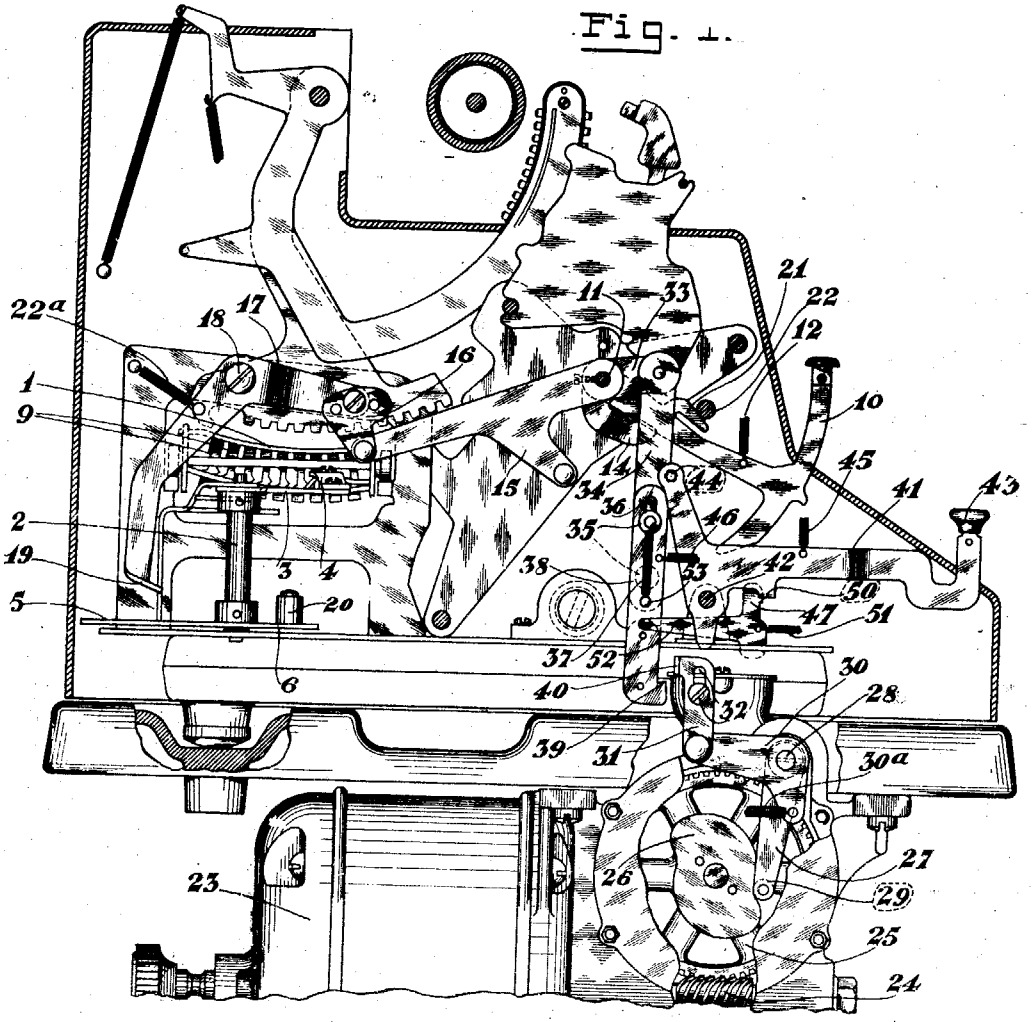
Fig. 1 is a longitudinal sectional view of such machine showing features of the present invention.
Figure 2:
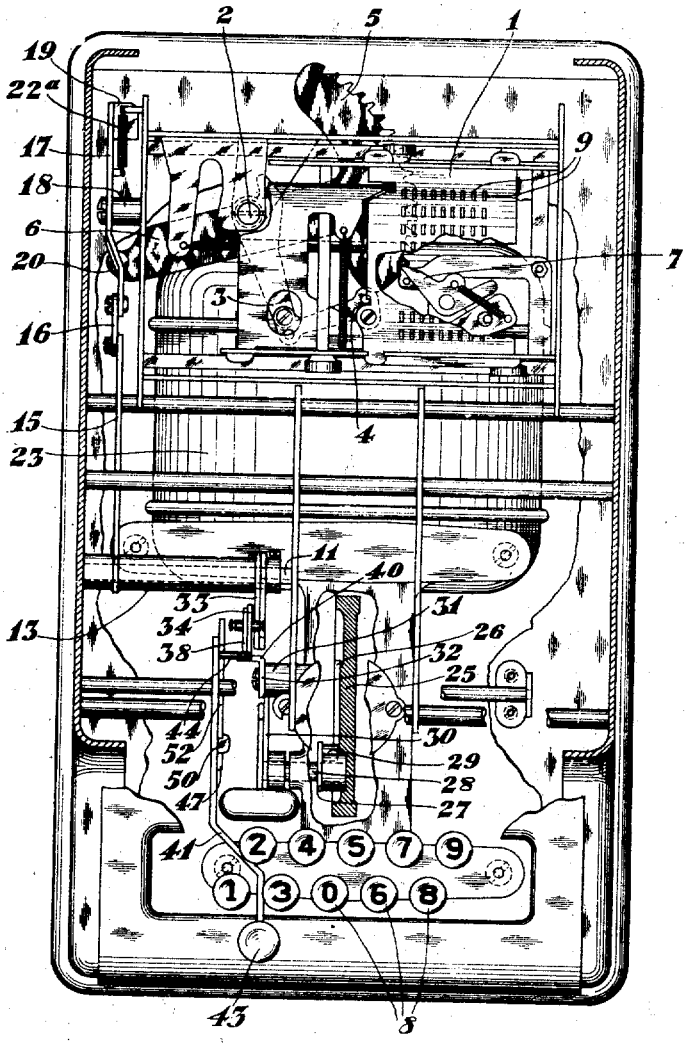
Fig. 2 is a view showing a plan of the differential mechanism and the means controlling the step by step movement thereof, and also the means for effecting a return of the differential mechanism to its starting point by operation of connections actuated by the motor.

The Dalton adding machine in which the present invention is shown comprises differential mechanism including a laterally movable carriage 1 which is connected up with a rock shaft 2 by means of an arm 3 attached to the rock shaft and a link 4 from the arm to said carriage. A ratchet segment 5 is in connection with an arm 6 that is secured to the rock shaft. Escapement devices 7 control the step by step movement of the segment 5, thereby controlling the step by step movement of the carriage 1 as the same is moved from order to order responsive to the operation of the numeral keys 8 in the usual manner. The differential stops 9 in the carriage 1 are set up by operation of the numeral keys as usual.

The Dalton adding machine comprises manipulative mechanism for restoring the differential mechanism to its starting point to clear the same in case error is made in striking the keys. Said manipulative mechanism comprises a key device 10 pivotally supported upon a shaft 11 and sustained in its normal position by a spring 12. A sleeve 13 is supported for rocking or turning movements on the shaft 11. An arm 14 is attached to the sleeve and extends under the arm of the key device 10 so that when said key device is depressed the sleeve 13 will be turned on the shaft 11. An arm 15 is also attached to the sleeve 13, having its rear end connected, by a link 16, with one arm of a bell crank lever 17. The lever 17 is operatively carried by a support 18 and the other arm of said lever extends downwardly and is provided with a laterally extended portion 19.

The arm 6 of the differential escapement segment carries a roll 20 in the line of movement of the extension 19; so that, if the differential mechanism be out of its idle position and the manipulative correction device be operated, the extension 19 will contact with the roll 20 and thereby actuate the shaft 2 and cause the differential mechanism to be restored to its starting or idle position. When the key device 10 is released the spring 12 restores it to its normal position in which a projection 21 on said key device abuts against a shaft 22. The sleeve 13 and the connections therefrom may be restored to their starting positions by an appropriate spring 22[a].

The manipulative connections for correcting error in the differential mechanism as above described are familiar and therefore require no further description, and I now proceed to describe the present invention for utilizing the power of the motor to clear the differential mechanism of error.

The usual electric motor 23 for controlling the operation of the machine is shown. In the present instance it is unnecessary to enter into or consider the construction, arrangement or mode of operation of the equipment and mechanism by which the user of the machine controls the operation of the motor. It is sufficient to mention the familiar fact that the motor is of the continuous running type and does not cease to operate except when the machine is left idle for a predetermined length of time. It is known that, in practice, the motor continues to run for a desired period after any operation of the machine thereby; and it has been found desirable to permit running of the motor for about three minutes, more or less, after any operation of the machine thereby, before the motor will stop automatically. However, the period of time during which the motor will continue to operate, or whether the motor stops automatically or not, are unimportant in a consideration of my present invention.

As shown, the armature shaft 24 of the motor is arranged to drive a gear 25. A cam 26 is driven by the gear 25. An arm 27 is attached to a shaft 28 and supports an anti-friction roll 29 which rides against the cam 26. An arm 30 attached to the shaft 28 has its end pivoted to a part 31 which is guided in its movements by a pin-and-slot device 32, and is actuated by a spring 30[a] to press the roll 29 against the cam 26.

A lever 33, which if desired may be an integral part of the arm 14, is in rigid connection with the sleeve 13 which is on the shaft 11. An elastic link device comprising a part 34 pivotally connected with the lever 33 which, by a construction comprising pins 35 and slots 36 and supporting springs 37, yieldingly supports and guides a member 38, is provided. The lower end of the member 38 is provided with a shoulder 39 adapted to be engaged by a finger 40 on the part 31 when the latter is moved downwardly. The elastic link device comprising the parts 34—38 is movable as required to place the shoulder 39 in or out of position to be engaged by the finger 40. Normally, said link device is in position in which the shoulder 39 will not be engaged by the finger 40 during the movements of said finger; but mechanism is provided under control of the user of the machine whereby the link device 34—38 will be operated to move the shoulder 39 to position to be engaged by the finger 40 as desired.

The lever 41 is pivoted upon a shaft 42. Said lever extends forwardly and is provided with a key button 43, said parts preferably being arranged with the key button at one side of the key board of the machine. An arm extends upwardly from the rear end of the lever 41 and supports an anti-friction roll 44 in contact with the forward edge of the elastic link 34—38. A spring 46 retains the lever 41 in a position to hold the elastic link 34—38 in an adjustment in which the shoulder 39 is out of the path of movement of the finger 40, thus leaving the finger 40 free to move up and down without engaging the shoulder 39. When it is desired to utilize the power of the motor to clear the differential mechanism the lever 41 is depressed by using the key or button 43, thereby moving the roll 44 forwardly away from the elastic link 34—38 and permitting the spring 46 to move the link to position the shoulder 39 in the path of movement of the finger 40; so that at the next operation of the cam 26 the finger 40 will engage the shoulder 39 and thereby operate the connections which restore the differential carriage 1 to its starting position in which the differential mechanism is ready to receive or to have set up therein any desired number.

When the lever 31 is depressed it will be held in its depressed position until the clearing operation is completed. A latch device is provided for this purpose, the same comprising a latch member 47 pivotally supported at 48 having a shoulder 49 arranged to engage above a lug 50 on the lever 41 when said lever is depressed. A spring 51 actuates the latch toward latching position. An arm 52 on the latch 47 extends rearwardly into the path of movement of a pin 53 which is on the link device 34—38. About or before the time that the link device completes its downward movement, the pin 53 contacts with the arm 52 thereby operating the latch 47 to release the lever 41. This permits the spring 45 to raise the lever 41 to actuate the link 34—38 to inoperative position when the finger 40 is released from the shoulder 39. Since the shoulder 39 is normally out of the line of movement of the finger 40 the latter is permitted to reciprocate in the normal operations of the machine without disturbing the differential mechanism. Therefore, in the normal operations of the machine the differential mechanism is cleared after each adding operation, except in cases of repeating, in the known manner.

From the foregoing it is clear that my invention efficiently accomplishes all of its intended purposes. The racks 54 which are controlled in their movements by the stops 9 when the latter are in their set positions are left unoperated when the stops 9 are moved from their set positions by the operation of the motor. This prevents entering of the error number into the result. The mechanism is free from complications and the operation is easily and simply controlled.

I do not restrict myself to unessential features, but what I claim and desire to secure by Letters Patent is:—

1. The combination with a motor, of parts movable to and from set positions, mechanism controlled by said parts in their set positions, a manipulative device for moving said parts from their set positions while said mechanism remains unoperated, and mechanism operable by the motor for moving said parts from their set positions while both said first-named mechanism and said manipulative device remain unoperated.

2. The combination with a motor, of parts movable to and from set positions, mechanism controlled by said parts in their set positions, connections controlled by the motor permitting said mechanism to operate, mechanism operable by the motor for moving the said parts from their set positions while said first-named mechanism remains unoperated, a device for moving said parts from their set positions independently of the motor, and manipulative means under control of the user of the machine determining when said motor may move said parts from their set positions as aforesaid.

3. The combination with a motor, of parts movable to and from set positions, mechanism controlled by said parts in their set positions, a manipulative device for moving said parts from their set positions while said mechanism remains unoperated, mechanism operable by the motor for moving said parts from their set positions while said first-named mechanism and said device remain unoperated, and means under control of the user of the machine determining when said motor may move said parts from their set positions as aforesaid.

4. The combination with a motor, of parts movable to and from set positions, mechanism controlled by said parts in their set positions, a manipulative device for moving said parts from their set positions while said mechanism remains unoperated, mechanism operable by the motor for moving said parts from their set positions while both said first-named mechanism and said manipulative device remain unoperated, and means under control of the user of the machine determining when said motor may move said parts from their set positions as aforesaid.

5. The combination with the differential mechanism of an adding machine movable to and from operative position, and parts whose operation is controlled by the differential mechanism when the differential mechanism is in its operative position, of a motor, manipulative connections for moving the differential mechanism from its operative position while said parts remain unoperated, and means for optionally operating said connections by the motor while said parts remain unoperated.

6. In an adding machine, the combination with differential stops settable to represent numbers, mechanism operable under control of the stops which are set to represent numbers, and manually operable connections for clearing the stops while said mechanism remains unoperated, of a motor, and a manipulative device normally preventing operation of said connections by said motor and being movable to position to permit said connections to be operated by said motor, and means for operating said connections by said motor after said manipulative device has been operated.

7. In an adding machine, the combination with differential mechanism settable in operative and inoperative positions, and parts whose operation is controlled by the differential mechanism when the differential mechanism is in its operative position, of connections for moving the differential mechanism to inoperative position while said parts are left unoperated, manipulative means for operating said connections, a motor, and mechanism for causing said motor to operate said connections to move the differential mechanism to inoperative position.

8. In an adding machine, the combination with differential mechanism, means for changing the condition of the differential mechanism from a clear condition to a condition in which said differential mechanism represents a selected number, movable parts whose extent of movement is limited by the differential mechanism when said mechanism is in a condition to represent a selected number, and manipulative connections for restoring the differential mechanism to a clear condition while said parts are left unoperated, of a motor, and means for utilizing the power of said motor to restore the differential mechanism to a clear condition while said parts are left unoperated.

9. In an adding machine, the combination with differential mechanism, means for changing the condition of the differential mechanism from a clear condition to a condition in which said differential mechanism represents a selected number, movable parts whose extent of movement is limited by the differential mechanism when said mechanism is in a condition to represent a selected number, connections for restoring the differential mechanism to a clear condition while said parts are left unoperated, and a manipulative device for operating said connections, of a motor, and optional means for operating said connections by said motor to restore the differential mechanism to a clear condition while the said parts are left unoperated.

10. In an adding machine, the combination with differential mechanism, means for changing the condition of the differential mechanism from an ineffective to an effective condition, operative mechanism whose operation is controlled by the differential mechanism when the latter is in an effective condition, connections operable to change the condition of the differential mechanism from effective condition to ineffective condition, and manual means for operating said connections, of a motor, an actuator operated by the motor, and means for operating said connections by said actuator to place the differential mechanism in ineffective condition while said said mechanism remains unoperated.

11. In an adding machine, the combination with differential mechanism movable from effective to ineffective position; of selectively operable means for moving said mechanism from effective to ineffective position comprising a rocking element, connections from said element for moving said mechanism from effective to ineffective position, a manipulative device for operating said element and thereby said connections to move said mechanism from effective to ineffective position, and a motor for operating said element and thereby said connections to move said mechanism from effective to ineffective position independently of said device.

12. In an adding machine, the combination with recording mechanism and differential mechanism movable to and from position to control the recording mechanism, of a rocking element, connections from said element for moving said differential mechanism from position in which it will control said recording mechanism, manipulative connections for operating said rocking element from the position in which it will control the recording mechanism while the recording mechanism remains stationary, a motor for operating said rocking element, means for operating a part of said last-named connections by said motor to move said differential mechanism from the position in which it will control the recording mechanism while the recording mechanism remains stationary, and a device controlling the operation of said part of said connections by said motor.

13. In an adding machine, a laterally movable carriage, manipulative connections for moving said carriage in one direction, a link for operating said connections, a device for operating said link, means for holding said link and said device normally disconnected and being movable to position to permit said link and said device to become connected, and a motor for operating said device.

14. In an adding machine, a carriage, connections for moving said carriage in one direction, a manipulative device for operating said connections, a link for operating said connections independently of said manipulative device, a motor, an actuator for actuating said link and thereby said connections to move said carriage, and a device normally preventing operation of said link by said actuator and being movable to position to permit said actuator to operate said link.

15. In an adding machine, a carriage, a device for moving said carriage in opposite directions, connections for actuating said device to move said carriage in one direction, a link for operating said connections, a motor, an actuator driven by the motor for operating said link, a lever normally holding said link and said actuator disconnected leaving the actuator free to operate while the link remains unoperated, means for moving said lever to permit engagement of said link and said actuator, and means for moving said link to position to be engaged by said actuator when said lever is moved.

16. In an adding machine, a carriage, a device for moving said carriage in one direction, connections for operating said device, a link for operating said connections, a motor, elements driven by said motor for operating said link, a lever holding said link disconnected from said elements leaving said elements free to operate while said link remains unoperated, means for moving said lever, a latch holding said lever in the position to which it is moved, and means for moving said link into position to be engaged by said elements when said lever is moved to the position aforesaid.

17. In an adding machine, a carriage, a device for moving said carriage in one direction, connections for operating said device, a link for operating said connections, a motor, elements driven by said motor for operating said link, a lever holding said link disconnected from said elements leaving said elements free to operate while said link remains unoperated, means for moving said lever, a latch holding said lever in the position to which it is moved, means for moving said link into position to be engaged by said elements when said lever is moved to the position aforesaid, and means for releasing said latch from said lever as an incident to operation of said link by said elements.

18. In an adding machine, a carriage, a device for moving said carriage in one direction, connections for operating said device, a link for operating said connections, a motor, elements driven by said motor for operating said link, a lever holding said link disconnected from said elements leaving said elements free to operate while said link remains unoperated, means for moving said lever, a latch holding said lever in the position to which it is moved, means for moving said link into position to be engaged by said elements when said lever is moved to the position aforesaid, means for releasing said latch from said lever as an incident to operation of said link by said elements, and means for operating said lever to move said link out of position to be engaged by said elements when said lever is released from said latch.

19. In an adding machine, recording mechanism, a carriage for controlling the recording mechanism and being movable from and to a starting position, connections for moving said carriage to its starting position from any position in which said carriage may be located, a manipulative device for operating said connections to move said carriage at a single movement to its starting position from any position in which said carriage may be located while the recording mechanism remains unoperated, and mechanism for operating said connections independently of said manipulative device to move said carriage to its starting point at a single operation from any position in which said carriage may be located while the recording mechanism remains unoperated.

20. In an adding machine, recording mechanism, a carriage for controlling the recording mechanism and being movable from and to a starting position, connections for moving said carriage to its starting position from any position in which said carriage may be located, a manipulative device for operating said connections to move said carriage at a single movement to its starting position from any position in which said carriage may be located while the recording mechanism remains unoperated, mechanism for operating said connections independently of said manipulative device to move said carriage to its starting point at a single operation from any position in which said carriage may be located while the recording mechanism remains unoperated, and optionally operable means controlling the operation of said mechanism.

21. In an adding machine, a carriage movable from and to a starting position, connections for moving said carriage to its starting position from any position in which said carriage may be located, a manipulative device for operating said connections to move said carriage to its starting position at a single operation from whatever position said carriage may be located, a motor, elements operated by said motor for operating said connections to move said carriage to its starting position, and a device for preventing or permitting said elements to operate said connections during the operation of the motor, as desired.

22. In an adding machine, a carriage movable from and to a starting position, connections for moving said carriage to its starting position from any position in which said carriage may be located, a manipulative device for operating said connections to move said carriage to its starting position at a single operation from whatever position said carriage may be located, a motor, elements operated by said motor for operating said connections to move said carriage to its starting position, a device for preventing or permitting said elements to operate said connections during the operation of the motor, as desired, means for moving said device to position to permit said elements to operate said connections, and a latch for holding said device in said position.

23. In an adding machine, a carriage movable from and to a starting position, connections for moving said carriage to its starting position from any position in which said carriage may be located, a manipulative device for operating said connections to move said carriage to its starting position at a single operation from whatever position said carriage may be located, a motor, elements operated by said motor for operating said connections to move said carriage to its starting position, a device for preventing or permitting said elements to operate said connections during the operation of the motor, as desired, means for moving said device to position to permit said elements to operate said connections, a latch for holding said device in said position, and automatic means for releasing said latch from said device as an incident to the operation of said connections by said elements.

24. In an adding machine, a carriage movable from and to a starting position, connections for moving said carriage to its starting position from any position in which said carriage may be located, a manipulative device for operating said connections to move said carriage to its starting position at a single operation from whatever position said carriage may be located, a motor, elements operated by said motor for operating said connections to move said carriage to its starting position, a device for preventing or permitting said elements to operate said connections during the operation of the motor, as desired, means for moving said device to position to permit said elements to operate said connections, a latch for holding said device in said position, automatic means for releasing said latch from said device as an incident to operation of said connections by said elements, and means for operating said device to position to prevent operation of said connections by said elements.

HARRY LANDSIEDEL.